United States Patent

Rosecan et al.

[11] Patent Number: 5,808,871
[45] Date of Patent: Sep. 15, 1998

[54] MODULAR COMPUTER TOWER ASSEMBLY

[75] Inventors: Albert F. Rosecan, McLean; James J. Geanakos, Arlington; Joseph S. Grajewski, Oakton; Juan J. Hernandez, Sterling, all of Va.; Juan L. Morales, Brookeville, Md.; James F. Reich, McLean, Va.; Michael S. Williams, Gambrill, Md.; Everett L. Yore, Arlington, Va.

[73] Assignee: SMS Data Products Group, Inc., McLean, Va.

[21] Appl. No.: 774,842

[22] Filed: Dec. 27, 1996

[51] Int. Cl.⁶ .................................................. H05K 5/02
[52] U.S. Cl. .................. 361/730; 361/685; 361/724; 361/727; 361/683; 361/732; 361/728; 361/825; 361/829; 312/257.1; 312/263; 312/265; 312/265.1; 312/265.2; 312/265.4; 174/52.1; 174/52.4; 174/61; 174/62; 174/63; 174/66
[58] Field of Search ..................................... 361/730, 685, 361/724, 727, 683, 731, 735, 732, 728, 729, 825, 829; 312/257.1, 263, 264, 265.1, 265.2, 265.4; 174/52.1, 52.4, 61, 62, 63, 66

[56] References Cited

U.S. PATENT DOCUMENTS

3,662,360 5/1972 Lambert .
4,453,785 6/1984 Smith .
4,530,066 7/1985 Ohwaki et al. .
4,682,833 7/1987 Ferchau et al. .
4,934,764 6/1990 Leitermann et al. .
4,950,039 8/1990 Helling .
4,971,563 11/1990 Wells, III .
5,227,957 7/1993 Deters .
5,271,152 12/1993 Murphy ..................................... 29/830
5,385,398 1/1995 Huys .
5,393,135 2/1995 Tisbo et al. .
5,397,176 3/1995 Allen et al. .......................... 312/223.2
5,399,004 3/1995 Buschle .
5,492,399 2/1996 Tillack .
5,515,239 5/1996 Kamerman et al. ..................... 361/727
5,602,721 2/1997 Slade et al. ............................. 361/727

Primary Examiner—Leo P. Picard
Assistant Examiner—David Foster
Attorney, Agent, or Firm—Eric P. Schellin

[57] ABSTRACT

A modular tower having a plurality of bays. The bays are fitted with rails upon which individual trays slide. The trays are detailed to carry electronic components. Each tray is fitted with electrical connectors which are connected to corresponding electrical connectors on a backplane in the tower. The tower can be employed vertically and horizontally. The tower has easily removable top and side panels and has a two component base that may be adjustably secured to one or more of the towers. The front thereof is fitted with a removable frame which carries a hinged door. The frame can be removed and rotated 180° in order to change the swing of the door from left to right and vice-versa.

13 Claims, 9 Drawing Sheets

MODULAR COMPUTER TOWER ASSEMBLY

TECHNICAL FIELD

The present invention relates to a modular computer supporting assembly having one or more main chassis with multiple bays. The resultant is often referred to as "tower" in the industry. The bays are detailed to hold all of the individual off-the shelf components selected for the computer system in slidable, removable trays, each tray is connected to a separate and usually passive backplane board. The bays are separate interconnectable units particularly designed to be suitable for housing remote peripherals.

BACKGROUND OF THE INVENTION

Modular computer systems are known in the art. Such systems are typically confined to the so-called central processing unit of the system. Such systems are herein defined generally as designed to permit the removal of system components, such as disc drives and boards, without the extensive use of tools to remove the component or the system cover or sides. Modular computer systems facilitate maintenance and service operations, allow easy upgrading operations, and provide some flexibility in the assembly of computer components. Such systems generally permit the ordinary user to rapidly change a system component thereby minimizing down time.

One such system is described in U.S. Pat. No. 4,934,764 to Leitermann et al and includes an extensible frame for receiving slidable equipment enclosures for a mainframe computer. The back wall of the enclosure is open to form a cable way at the rear of the frame for cables which extend up and down the system to connect the various components in the enclosures.

Another mechanism for modular assemblies is described in U.S. Pat. No. 4,682,833 to Ferchau et al and includes a cabinet with cavities for drawers having electrical connections for attaching a disc drive for a supermini computer. The rear of each drawer includes a connector for attachment to a mating connector at the rear of the cabinet. A pin-and-aperture registration mechanism is included for proper alignment.

One other system is described in U.S. Pat. No. 4,530,066 to Ohwaki et al. The Ohwaki system expands a personal computer by sliding the electrically connected power and main signal processing section apart so that an additional signal processing section contained in a housing may be inserted into an electrical connector.

Backplane assemblies are known in the art. Such assemblies generally consist of a series of multiway sockets wired in parallel and connected to the buses of the computer to enable the computer to communicate with peripherals, such as disc drives, boards, controllers, etc. One such assembly is described in U.S. Pat. No. 4,971,563 to Wells which uses a backplane removably attached to the chassis of a central processing unit for mounting accessory boards.

A heretofore unmet need exists for a computer system in which some or all system components are modular and connect to a passive backplane in vertically or horizontally disposed proximate towers and which is adapted for use with off-the-shelf computer system components.

SUMMARY OF THE INVENTION WITH OBJECTS

A general object of the present invention is to provide a modular computer system that overcomes the limitations and drawbacks of the prior art.

Another general object of the present invention is to provide a modular computer system enabling off-the-shelf computer components to be installed from the front of the computer.

A specific object of the invention is to provide a modular computer system having a unitary tower chassis with multiple bays, carrying slidable trays for plug in attachment of conventional computer components, each tray interfacing one or more said components to a backplane connector board, and wherein the backplane is, in at least some cases, passive.

Still another specific object of the invention is to provide a modular computer system that may be expanded by adding additional towers with additional bays, the bays are further usable at remote locations and capable of housing multiple system components.

The chassis defines a frame constructed from an enclosure with vertically or horizontally interconnectable bays for slidably receiving trays. A unitary front door assembly is hingedly detailed to cover the front of the chassis and provides a locking and security mechanism. The door assembly is capable of being demounted and rotated 180 and re-mounted to thereby change the swing of the door. The chassis supports and secures therein all of the system components.

Each tray defines a generally, U-shaped construction, with a back wall, side walls and an open front. The outermost portion of the side walls terminate in oppositely disposed angled ears. The ears are detailed to retain the tray in place by being mateable with suitable disposed surfaces at the front of the bays. The tray has a short bottom surface at the back wall. The back wall is filled with electronic coupling bus components and the like.

A preferred embodiment includes a chassis with a plurality of interconnected bays for standard off-the shelf computer components including disc drive, data storage devices, a power supply and an open bay for optional components as desired. Other arrangements are contemplated and additional bays may be added and connected to the system through an external cable harness.

The preferred embodiment also includes cartridges for encasing off-the-shelf expansion cards. The cartridges enable the cards to be installed and removed from the trays without touching the component elements.

The chassis is supplied with an intermediately disposed backplane wall spaced from the rear of the chassis. The said wall is filled with vertically disposed spaced pin connectors detailed to electrically operatively mate with bus connectors of the individual trays.

A cable block and harness may be attached to the said intermediately disposed wall in order to attach I/O devices such as computers, CD-ROM drives and tape drives and external disc drive, etc. The cable harness further allows a remote tower of the type disclosed herein to be attached to the system.

These and other objects, features, aspects and advantages of the present invention will be more fully apparent to those skilled in the art upon consideration of the following detailed description of the preferred embodiments, presented in conjunction with the accompanying drawings.

BRIEF DESCRIPTION OF THE DRAWINGS In the Drawings.

DETAILED DESCRIPTION OF THE INVENTION

Figure 1:
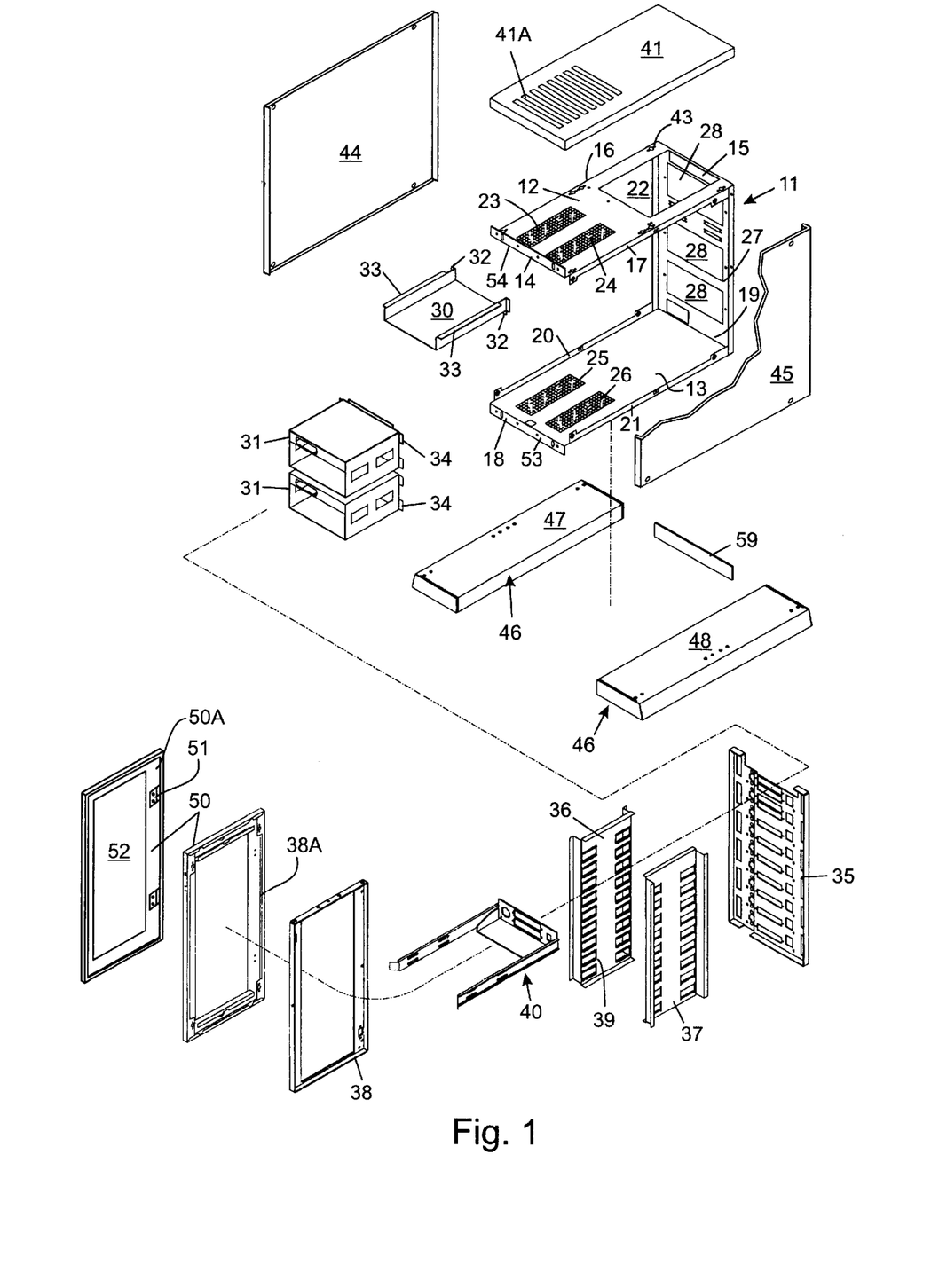
FIG. 1 is an exploded and perspective view of the tower of the present invention.

Attention is now directed to the figures, and especially, to FIG. 1 wherein like reference numerals refer to like parts throughout the figures.

The tower of the present invention includes a sheet metal subchassis 11 having, generally, a U-shaped configuration consisting of an upper plate 12 and parallely spaced therefrom a lower plate 13. The plates, in a preferred embodiment, are rectangular in configuration with shorter ends and longer sides. Specifically, the upper plate 12 has a flange 54 at the front end 14 and a back end 15. The upper plate also has a first edge portion 16 and a second edge portion 17. Likewise, the lower plate has a flange 53 at the front end 18 and a back end 19. The lower plate 13 also has a first side edge portion 20 and a second side edge portion 21. The upper plate has a number of optional apertures. For instance relatively large aperture 22 provides access therethrough to electronic components that may be situated thereinunder but are not part of the present invention. Apertures 23 and 24 have screens thereover and are provided to increase heat dissipation. The lower plate 13 is also supplied with screened heat dissipating apertures 25 and 26.

The back end 15 of the upper plate and the back end 19 of the lower plate are connected by a vertical back wall 27. The said back wall has a number of apertures 28 to thereby provide access therethrough for electronic components or bundles of wires such as one or more power supplies and/or one or more electrically motorized fans (none of these elements are shown as they are conventional). These electronic components or bundles of wires are supported in housings 30 and 31 shown exploded from the subchassis 11. When assembled the housing 30 is secured by flanges 32 to the back wall 27 and to the underside of the upper plate 12 by flanges 33. Housings 31 are affixed to the back wall 27 through flanges 34. The flanges are supplied with holes which are aligned with suitably positioned corresponding holes on the upper plate 12 and back wall 27 whereby conventional fasteners may be used to mount the housings 30 and 31.

Figure 22:
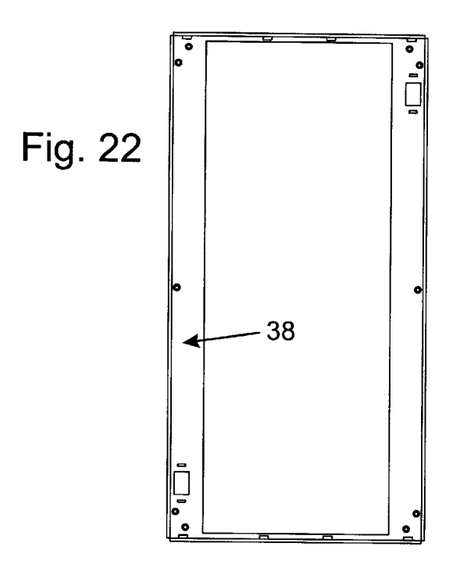
FIG. 22 shows the inside of the outer front of the tower.
Figure 23:
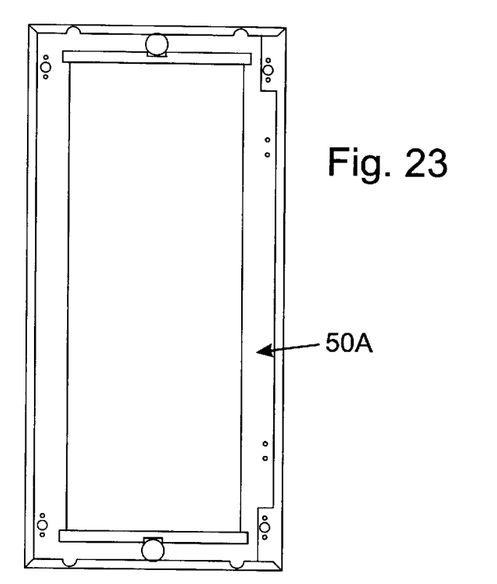
FIG. 23 shows the inside of the front hingeable bezel of the tower.
Figure 24:
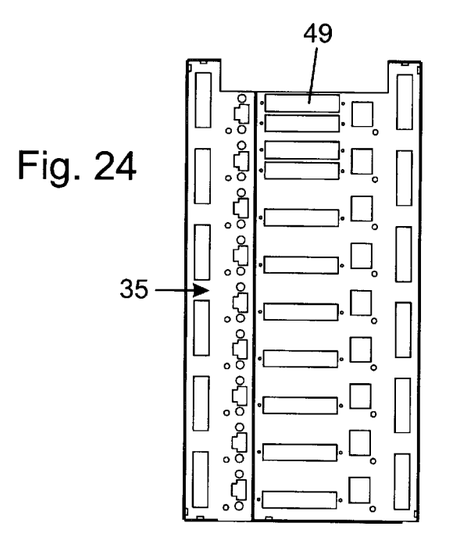
FIG. 24 is the front view of the back plane.

Additional elements encompassing the subchassis 11 are backplane 35, a first tray supporting side wall 36 and, facing oppositely disposed, a second tray supporting side wall 37 and a front frame 38. The backplane 35 is shown in greater detail by FIG. 24. The internal side of the front frame 38 can be seen in greater detail in FIG. 22.

Figure 20:
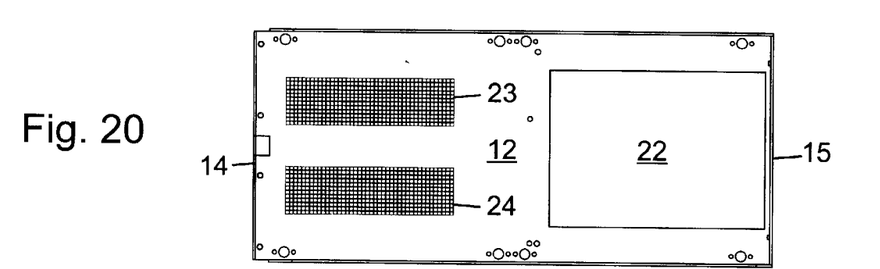
FIG. 20 is a top view of the subchassis with the cover removed.
Figure 21:
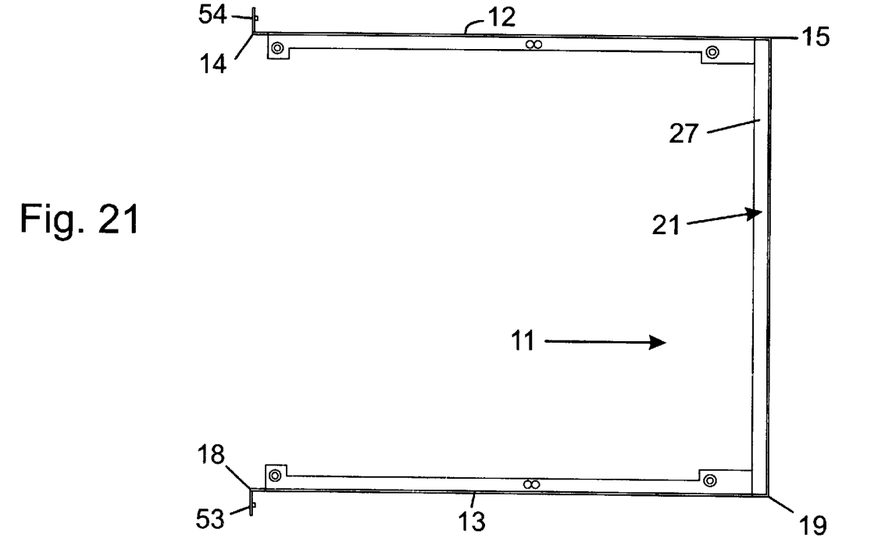
FIG. 21 is a side view of the subchassis with the side panel removed.
Figure 25:
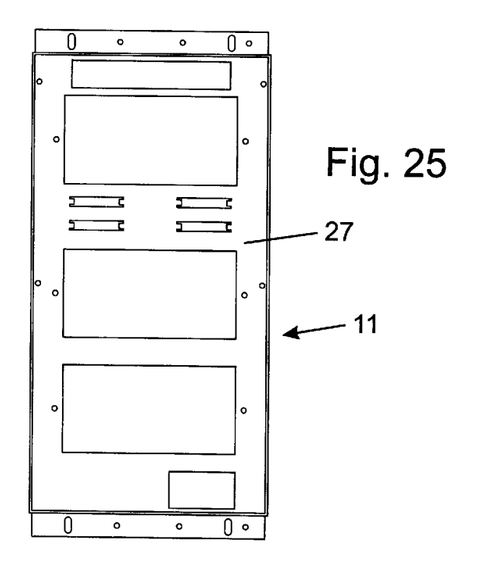
FIG. 25 shows the back view of the tower with the back panel in place.

Likewise the back wall 27 of the subchassis 11 can be seen in FIG. 25. While the U-shaped configuration of the subchassis 11 can be readily seen in FIG. 21. The top of the subchassis 11 and, especially, upper plate 12 can be seen in FIG. 20.

The backplane 35 is mounted between upper plate 12 and lower plate 13 at a position whereby it is closer to the back wall 27 and parallel therewith, than to the front ends 14 and 18 of the upper plate 12 and lower plate 13, respectively. The backplane 35 has a plurality of openings 49 detailed to accept affixed therethrough electronic connectors (not shown).

Forward of the backplane 35 and perpendicular thereto are the two oppositely facing tray supporting side walls 36 and 37. Tray supporting side wall 36 is mounted to supportingly connect the first edge portion 16 of upper plate 12 with the edge portion 20 of lower plate 13. Likewise the tray supporting side wall 37 is mounted to supportingly connect the second edge portion 17 of upper plate 12 with the second edge portion 21 of lower plate 13. The said tray supporting side walls 36 and 37 are supplied with a plurality of oppositely facing rails 39 which are parallel to each other. Conveniently, the rails may be constructed by mechanically upsetting a portion of the metal surrounding previously cut apertures in the tray supporting side walls 36 and 37. The rails 39 are detailed whereby trays 40 may slide thereupon. Discussion with regard to the trays will be supplied below.

The front of the subchassis is fitted with frame 38A. The frame 38A is affixed to the flange 54 of the front end 14 of the upper plate 12 and to the flange 53 of the front end 18 of the lower plate 13 by conventional means. The frame 38A is detailed to carry a bezel assembly 50 which includes a frame 38 and hinged thereto, by hinges 51, a door 50A. The door has a window 52.

When it is desired to change the swing of door from a left-hand hinge to a right-hand hinge 51 or vice-versa, the entire frame 38A carrying the door 50A is unsnapped from the subchassis 11, turned 180° and re-mounted.

Having discussed the structure of the subchassis 11 in the above, it is now appropriate to cuss the parts of the chassis 29 of the tower of the present invention which surrounds the subchassis 11.

Figure 2:
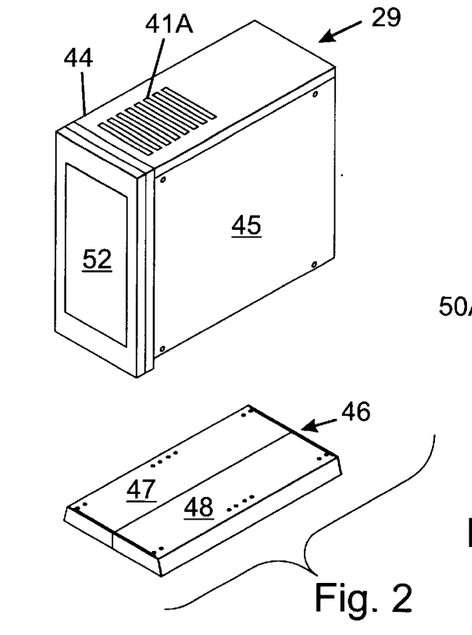
FIG. 2 is a perspective view of the tower exploded from its two adjacent two component base.
Figure 17:
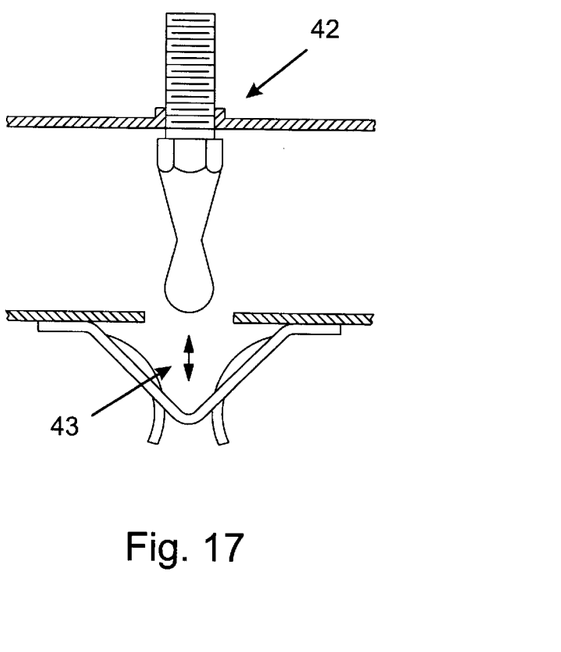
FIG. 17 is a fragmentary cross-sectional view of the ball stud and spring catch receptacle used for fastening together the outer panels.
Figure 18:
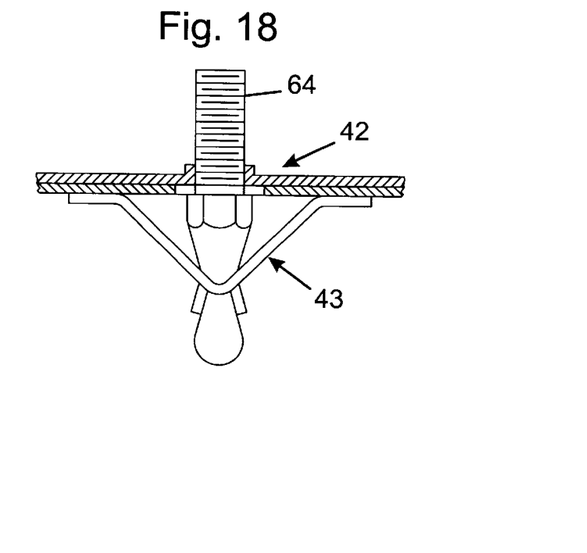
FIG. 18 is similar to FIG. 17 but shows ball stud in position in the receptacle.

The subchassis 11 is fitted with a removable top panel 41. The top panel 41 has a series of slots 41A which are dimensioned and configured to vertically retain CD-ROM jewel boxes. The top panel 41 has a downwardly extending flange portion which carries a series of peripherally spaced ball stud mechanical connectors 42 which mate into spaced spring loaded female connectors 43 located on the upper plate 12. Attention is directed to FIGS. 17 and 18 for a more detailed consideration of the aforementioned connectors. Similarly, side panels 44 and 45 are affixed to the side of the subchassis 11 by conventional means. The subchassis 11 is mounted desirably on a base 46. The base 46 consists of two mirror-image elongated rectangular shaped components 47 and 48 that in the embodiment shown by FIG. 2 are in abutment when assembled. The said components are dimensioned and configured whereby they substantially underlie the subchassis 11 including the side panels 44 and 45.

The base components are affixed to the underside of the subchassis 11, i.e. to the underside of lower plate 13.

The base components 47 and 48 are attached side by side to a downwardly depending flange 53 of the front end 18 of lower plate 13. As the back end 19 of the lower plate does not have a flange, it has been found propitious to affix a small rectangular plate 59 to the respective ends of the base components 47 and 48.

Attention is now directed to FIGS. 2–5 for different arrangements of use of the tower of the present invention. In FIG. 2, one can see the perspective of the tower of the present invention assembled with the components shown in FIG. 1 with the tower exploded from its base 46.

Figure 3:
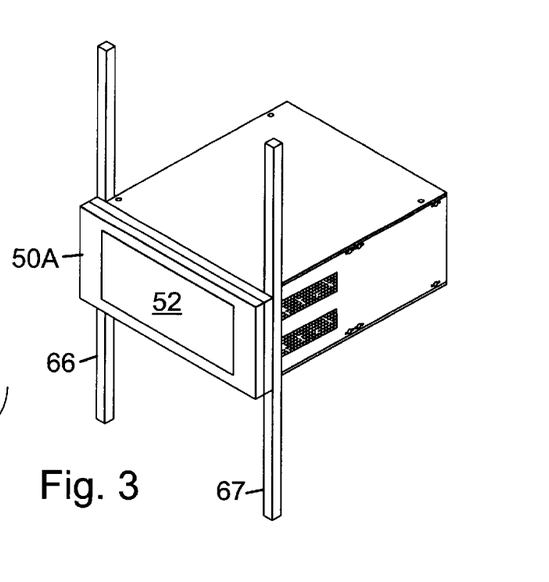
FIG. 3 is a perspective view of the tower of the present invention in a horizontal rack mounting with the bottom and top removed.

In FIG. 3 one can see the tower in a horizontal rack mounted position with its top panel 41 removed and the base 46 removed whereby the flanges 53 and 54 are utilized to effect attachment to upright supports 66 and 67, not a part of the present invention. Additional towers may be similarly mounted below and above the tower shown.

Figure 4:
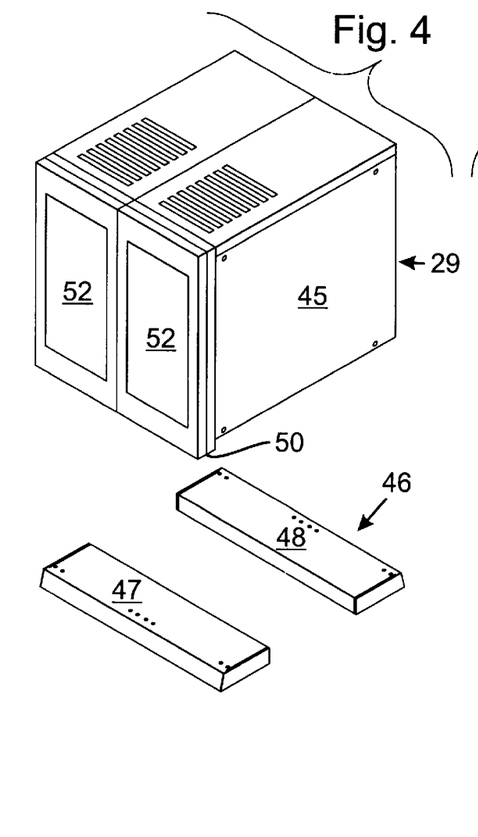
FIG. 4 is a perspective view of two adjacent towers of the present invention with a two component separated base.
Figure 5:
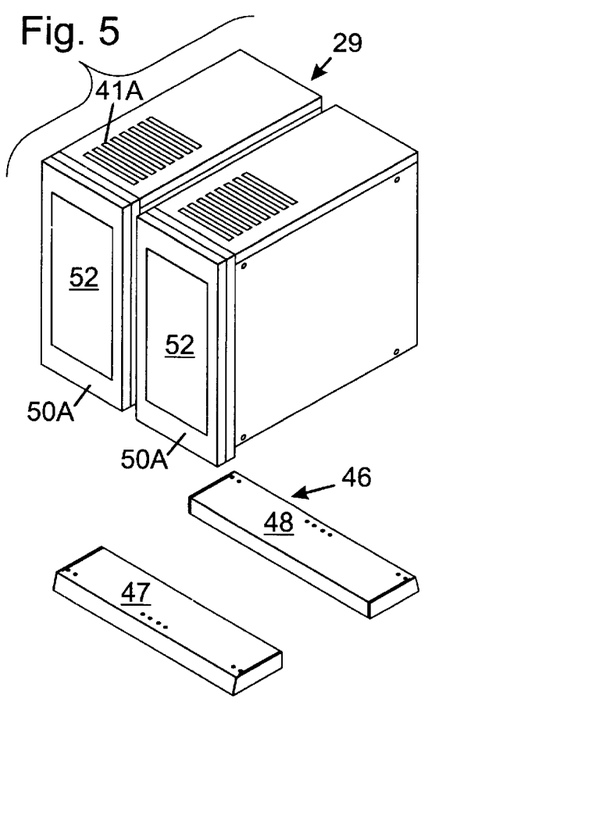
FIG. 5 is similar to FIG. 4 except that the two adjacent towers are slightly horizontally displaced.

FIG. 4 shows the use of base components 47 and 48 so they underlie two vertically disposed towers which are essentially in abutment. In FIG. 5 the two towers are spaced slightly apart. This can be accomplished by providing ball stud mechanical connectors and the female mechanical connectors in a manner to accomplish the stated goal.

Figures 6, 7, 8, 9, 10, 11:
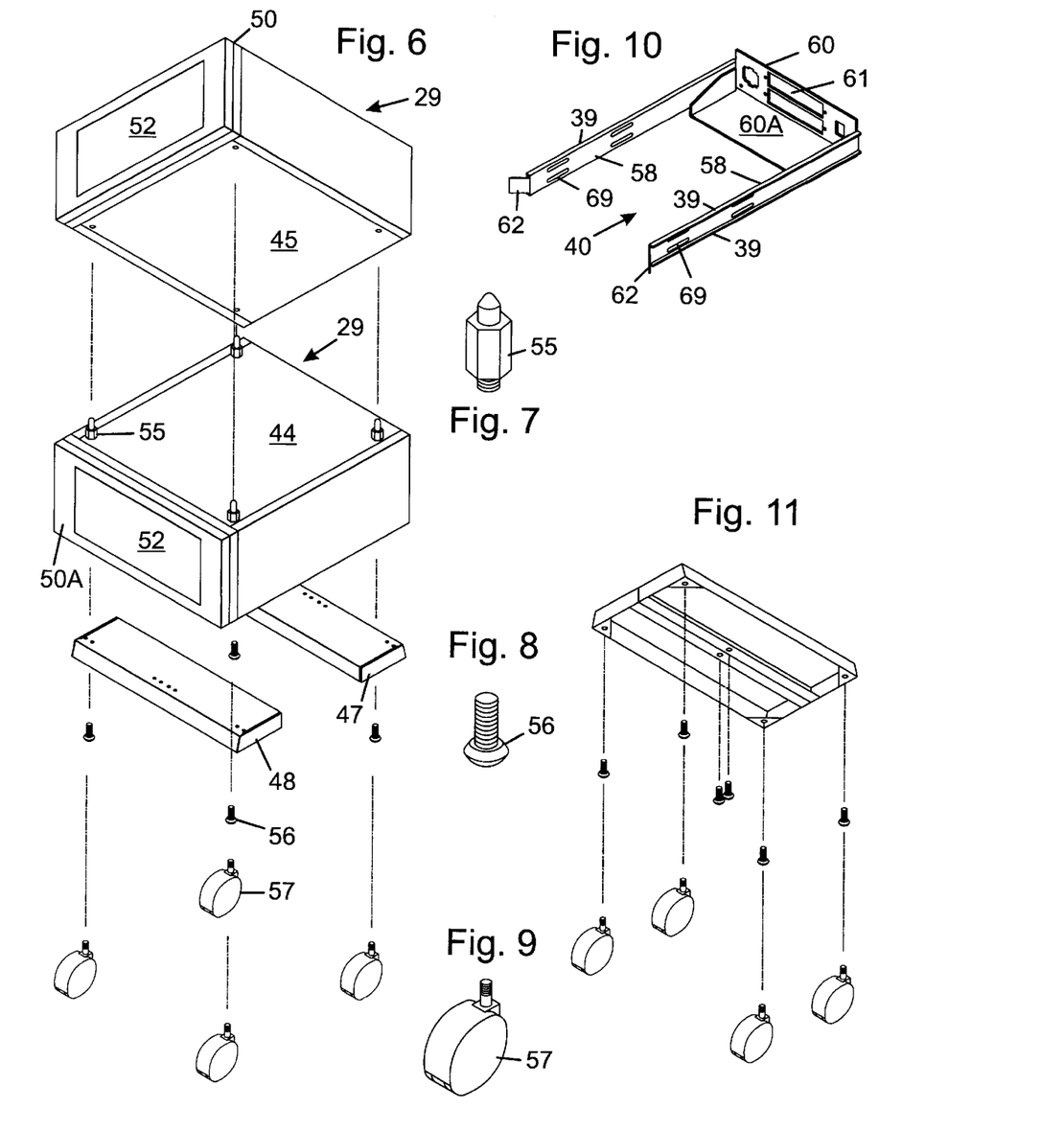
FIG. 6 is a perspective and exploded view depicting two towers in a horizontally disposed position having either feet or casters at the bottom of the two spaced component base facing a horizontally disposed tower.
FIG. 7 is a pin of FIG. 6 adapted and constructed to join overlying horizontally disposed towers of the present invention.
FIG. 8 is to a threaded foot of FIG. 6.
FIG. 9 is a view of the caster shown in FIG. 6.
FIG. 10 is a perspective view of the tray for carrying a component in a bay of the tower.
FIG. 11 is a perspective view of the bottom of the two component base and exploded therefrom are either the feet of FIG. 8 or the casters of FIG. 9.

FIG. 6 depicts the use of two towers of the present invention in a horizontal position. It will be noted that the side panel 44 becomes the top panel of the bottom tower and the panel 45 the bottom of the top tower. The towers are retained in juxtaposition by pins 55 which have a threaded portion and an unthreaded portion. Suitable threaded holes are supplied in the said side panels and receptacle holes opposite thereto. The lower tower may be simply fitted in similarly positioned holes either by a conventional foot 56 screwed thereinto or a caster 57 which may be screwed thereinto. As desired the base 46 comprising the base components 47 and 48 may be horizontally spaced and attached to the downwardly facing panel by means of the four aforementioned provided holes having ball stud connectors 42.

FIG. 7 shows the pin 55. FIG. 8 depicts foot 56. FIG. 9 shows an example of a suitable caster. From FIG. 11 one can see the underside of base 46 with either the feet 56 or four casters 57 may be employed as shown in exploded fashion.

Attention is now directed to FIG. 10 for a further consideration of the tray 40. It is pointed out that it has, generally, a "U" shaped configuration with two forwardly extending side legs 58, with the apex of the "U" being an end plate 60. It also has a forshortened bottom portion 60A. The legs 58 contain industry standardized slots 69 by means of which electronic devices can be affixed and held between the said legs 58. Each of the legs also have outwardly extending pairs of rails 39 adapted and constructed to slidable move on the pairs of rails located on said first tray supporting side wall 36 and the oppositely disposed second tray supporting side wall 37. The rails on the legs of the trays consist of spaced parallel outwardly extending flanges. The rails on the two tray supporting side walls 36 and 37 consist of similarly spaced parallel inwardly extending flanges wherein the distance between the rails of the tray supporting side walls is slightly less than the distance between the rails of legs of the trays whereby the rails of the latter ride on the rails of the former. In this fashion the trays 40 will slide on the rails of the side walls and will do so even if the tower is positioned horizontally as the trays cannot become dislodged from the rails except by being slidably removed from the bay through the front opening as depicted.

It will be seen that the end plate 60 of the tray has a number of orifices 61 for carrying bus connectors and other types of electrical connectors as needed. It should also be noted that the ends of the side legs 58 of the trays terminate in ears 62 which are at oppositely acutely disposed angles with respect to side legs 58. The trays are constructed of metal and are of such tolerance that the legs 58 ride between the side walls 36 and 37 with a relatively high degree of friction to thereby prevent inadvertent dislodgement. The tray fits completely into its respective bay except for the ears which do not and therefore protrude from the front of the bays. To decrease or remove the friction of the legs 58 of the tray on the side walls 36 and 37 it is merely necessary to remove bezel assembly 50 and to deflect the ears 62 slightly towards each other and at the same time to pull the tray from its respective bay and out of the tower. At the same time the removal of the trays disengage its electrical connecting components on the end plate 60 of the tray from the mateable electronic couplers mounted in the orifices of the backplane 35.

In essence it will be seen that shoving inwardly a tray, which has been loaded with an electronic component to which has been suitably wired to its respective connectors, results in connecting said electronic component to a connector on the backplane 35. The reverse is accomplished to disengage the connectors from each other and the tray can be withdrawn for fitting with an electronic device of a different type. The backplane 35 is conventionally and suitably wired whereby the electrical coupling may be achieved between different electronic parts carried on the trays. These electronic parts may not necessarily have to be on adjacent bays but may result in any combination.

Figures 12, 13:
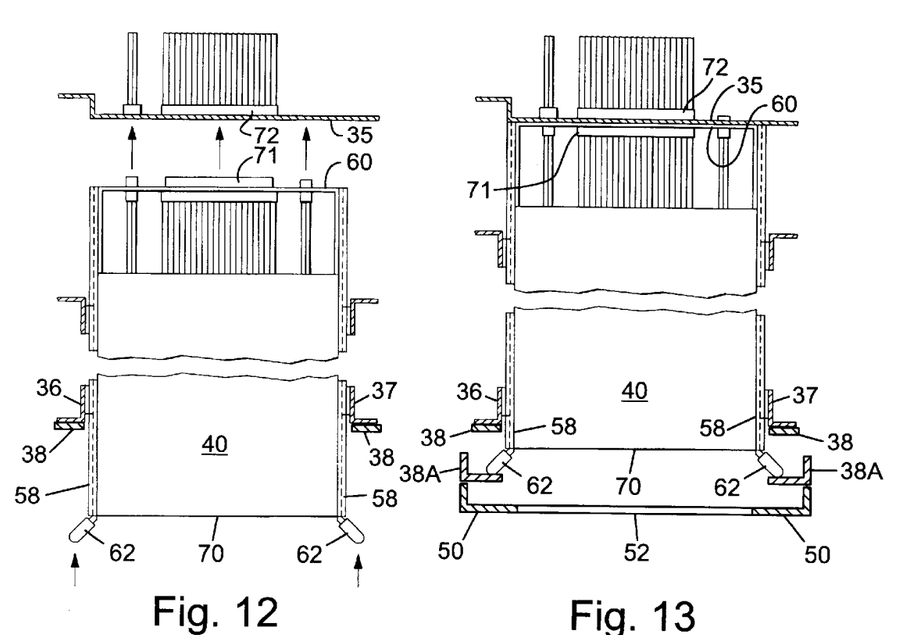
FIG. 12 is a view from above showing the tray in fragmentary condition being slid in the direction of the backplane for mating therewith.
FIG. 13 is a similar view as FIG. 12 where the tray and its bus connector are connected at the back plane.

FIGS. 12 and 13 is a top end fragmentary view showing a tray 40 carrying electrical connectors 71 at the end plate of the tray 40 being directed towards the backplane 35 to which electrical connectors 72 are rigidly mounted; said connectors being mateable. In FIG. 13 one can see the tray 40 in place with the connectors mated. For further clarification in FIGS. 12 and 13 fragmentary cross-sections of the first tray supporting wall 36 and the second tray supporting wall 37 are shown. FIG. 13 depicts a cross-section of the front frame 38 to which bezel assembly 50 is removably secured. It will be noted that ears 62 of the trays 40 abut against the inner side of frame 38A. The mere opening of the door does not permit access or view of the ears 62 of the trays 40 thereby achieving an esthetically pleasing view. Access, in order to remove trays 40 can only achieved with the unsnapping and removal of the bezel assembly 50 which as stated carries frame 38A and door 50A.

Figure 14:
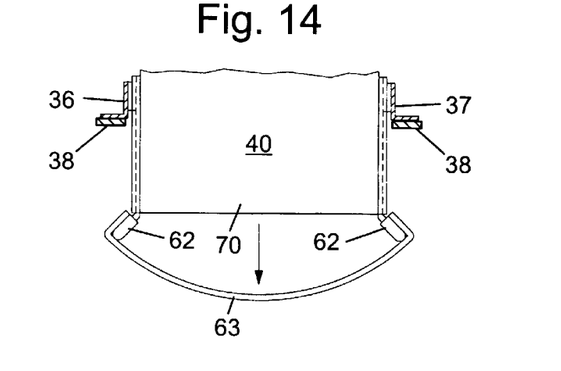
FIG. 14 is a top fragmentary view of the forward part of the tray with a special tool is used to slidably withdraw a tray with component from its bay.

FIG. 14 is a similar top plan view as in regard to FIGS. 12 and 13, with the bezel assembly 50 removed depicting the use of a metal resilient tool 63 which can be placed over the ears 62 of the tray. The act of pulling on the tool 63 draws the ears towards each other thereby releasing the internal friction of the side legs 58 of the tray in impingement on the internal surfaces first and second tray supporting side walls.

Figure 15:
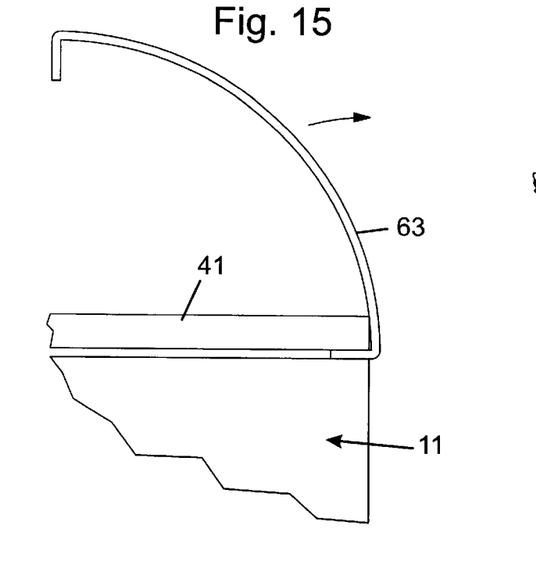
FIGS. 15 and 16 is a fragmentary view with the special tool being used in successive steps to dismantle a portion of the tower.
Figure 16:
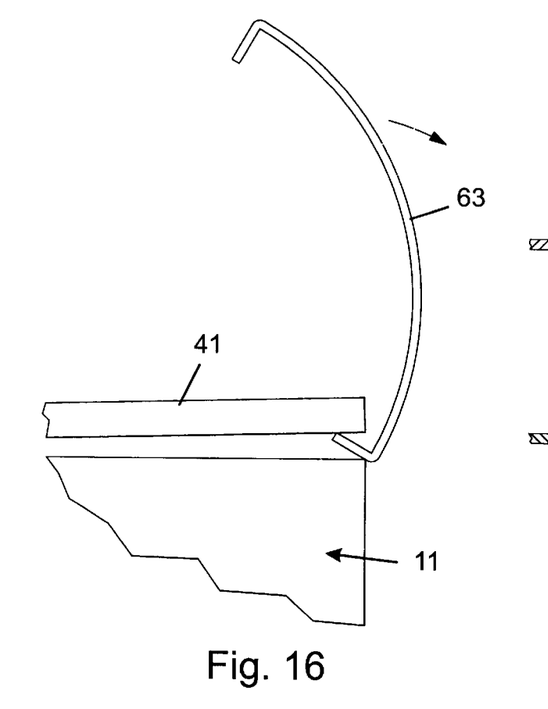

Then FIGS. 15 and 16 show the use of the tool 63 to apply releasing leverage to any panel, in position on subchassis 11. FIGS. 17 and 18 are cross-sections and fragmentary to depict the male connector 42 having a thread 64 mounted to a portion of the subchassis 11 which mates with a female connector 43 of a panel. FIG. 17 shows by the arrows engagement and disengagement.

Figure 19:
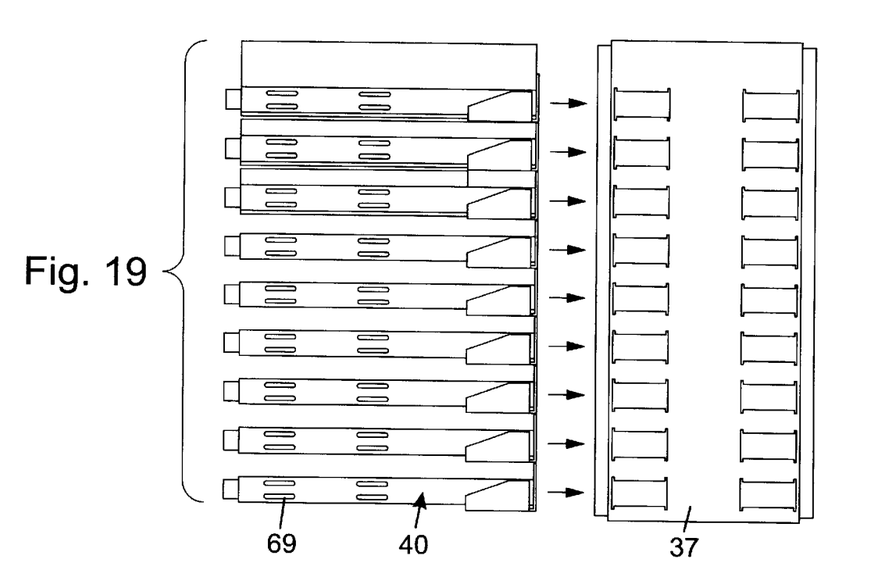
FIG. 19 is an exploded side view showing a plurality of trays being inserted into a tower showing the retaining means.

FIG. 19 schematically shows a side view of a plurality of trays 40 about to be introduced into alignment in bays with one of the tray supporting side walls.

FIGS. 20–25 are believed to have been adequately discussed in conjunction with FIG. 1 in the foregoing.

Figure 26:
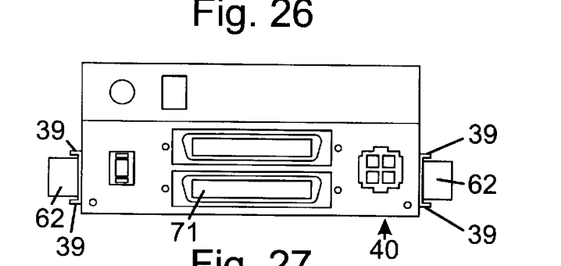
FIG. 26 is a back end view of a tray with an ethernet component in place.
Figure 27:
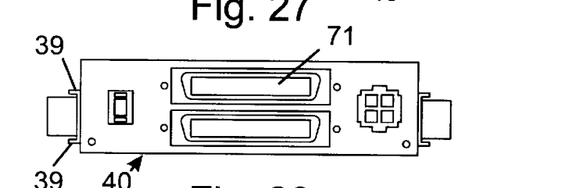
FIG. 27 is similar to FIG. 26 but with another component in place on the tray.
Figure 28:
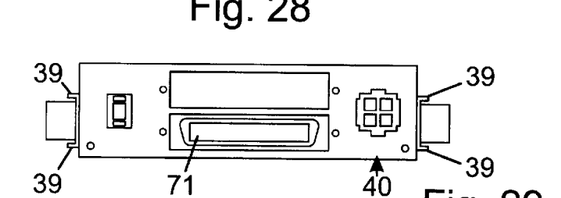
FIG. 28 is similar to FIG. 26 but with still another component in place.
Figure 29:
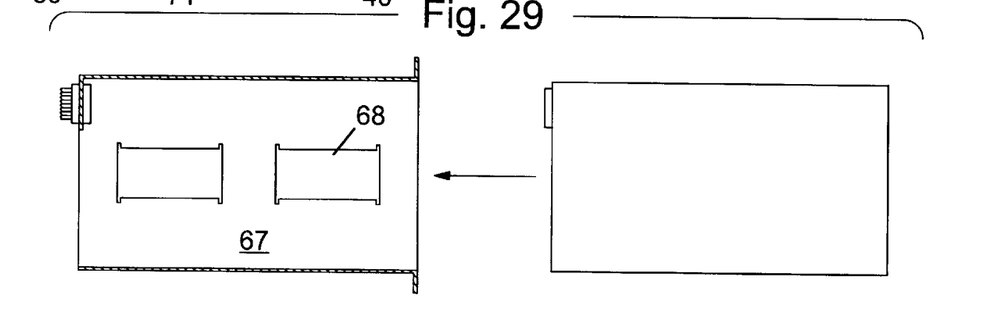
FIG. 29 is an exploded view showing the power supply being slid into the cage.

FIGS. 26, 27 and 28 are rear views of trays 40 loaded with electronic devices with suitable and appropriate bus connectors 71. FIG. 26 shows that a larger than normal electronic device can be accomodated as it extends above the tray 40. FIG. 27 shows the need for two bus connectors 71, while FIG. 28 calls for only a single bus connector 71. FIG. 29 shows a power supply 65 being mounted rearwardly into the space between the backplane 35 and the back wall 27.

Figure 30:
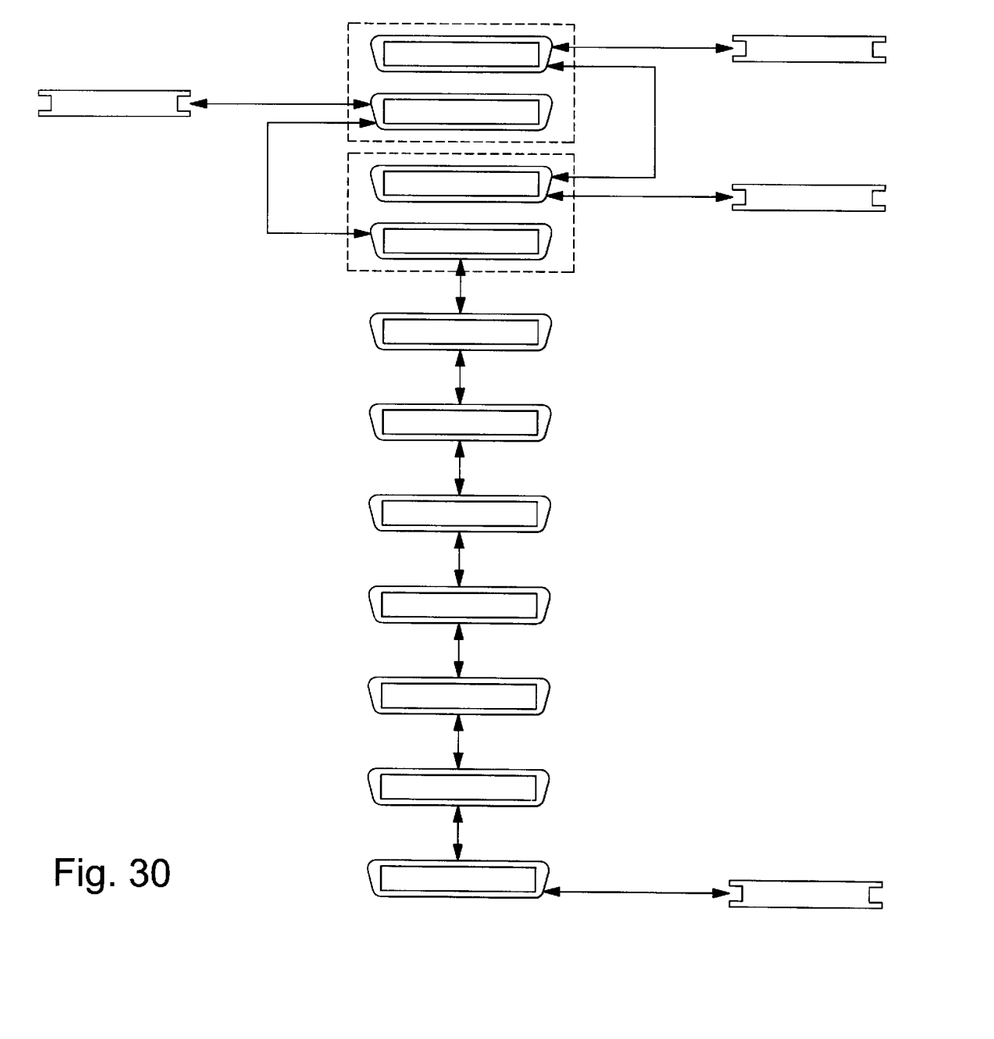
FIG. 30 is a schematic showing various electronic components which are on their respective trays (not shown) with the schematic depiction of the wiring.

FIG. 30 depicts the electrical connection for the various bus connectors through appropriate means as by SCSI "Small Computer Standard Interface" connections whereby any selected path may be set up. The openings 49 are considerable in number, especially in the upper portion thereof where four openings are positioned in a close vertical row whereby the use of well known SCSI connectors a varied wiring diagram may be achieved whereby wiring may be accomplished from tower to tower or internally within the confines of a single tower, all as found desirable.

The preferred embodiment described is only illustrative of the invention. Variation will occur to those skilled in the art, and the invention is not limited to the specific embodiment described but is described by the following claims.

What is claimed is:

1. A modular frame assembly for housing computer components comprising:

an inner subchassis including a rectangular upper plate and a rectangular lower plate, each of said upper plate and said lower plate having a first end and a second end and each of said upper plate and said lower plate having oppositely disposed first and second sides, said first end of said upper plate and said first end of said lower plate being connected by an upstanding back plate, said upper plate and said lower plate being connected by a backplane, said backplane being spaced and parallel to said upstanding back plate, said backplane being spaced from the respective ends of said second ends of said upper and lower plates, a first subchassis side plate connecting the first side of said upper plate with the first side of said lower plate, a second subchassis side plate connecting the second side of said upper plate with the second side of said lower plate, said side plates being dimensioned to extend at least from said upstanding back plate to the second ends of said upper and lower plates, said side plates having a plurality of facing inwardly directed spaced parallel rails, an outer chassis including a first side panel adapted and constructed to extend from the first side of said upper plate to the first side of the lower plate and over the inner subchassis first side plate, a second side panel adapted and constructed to extend from the second side of said upper plate to the second side of the lower plate and over the said second subchassis plate; a first frame being connected to the said second end of the upper plate and to the second side of the lower plate; at least one electronic component carrying tray adapted and constructed to be slidably engageable on said rails of said first and second side plates, said trays carrying electronic components being attached to bus connectors mounted at the end of the tray, said backplane having at least one bus connector, said bus connector of said tray adapted and constructed to electrically connect with a mateable bus connector of said backplane.

2. A modular frame assembly for housing computer components comprising:

an inner subchassis including a rectangular upper plate and a rectangular lower plate, each of said upper plate and said lower plate having a first end and a second end and each of said upper plate and said lower plate having oppositely disposed first and second sides, said first end of said upper plate and said first end of said lower plate being connected by an upstanding back plate, said upper plate and said lower plate being connected by a backplane, said backplane being spaced and parallel to said upstanding back plate, said backplane being spaced from the respective ends of said second ends of said upper and lower plates, a first subchassis side plate connecting the first side of said upper plate with the first side of said lower plate, a second subchassis side plate connecting the second side of said upper plate with the second side of said lower plate, said side plate being dimensioned to extend at least from said upstanding back plate to the second ends of said upper and lower plates, said side plates having a plurality of facing inwardly directed spaced parallel rails, an outer chassis including a rectangular top adapted and constructed to overly said upper plate, a first side panel adapted and constructed to extend from the first side of said upper plate to first side of the lower plate, and over the inner subchassis first side plate, a second side panel adapted and constructed to extend from the first side of said upper plate to the first side of the lower plate and the said inner subchassis second side plate, said subchassis overlying and being removably mounted on a base, said base being constructed of two rectangularly-shaped mirror image portions; a first frame being connected to the said second end of the upper plate and the said second end of the lower plate; at least one electronic component carrying tray adapted and constructed to be slidably engageable on said rails of said first and second side plates, said trays carrying electronic components being attached to bus connectors mounted at the end of the tray, said backplane having at least one bus connector, said bus connector of said tray adapted and constructed to electrically connect with a mateable bus connector of said backplane.

3. The modular frame assembly for housing computer components of claims 1 or 2 wherein a door assembly is mounted to said frame, said door assembly includes a second frame and having a door hingedly mounted to said second frame to form a unitary structure with said second frame adapted and constructed to be released from said second frame turned 180° and remounted to said second frame whereby the hinges are repositioned.

4. The modular frame assembly for housing computer components of claims 1 or 2 wherein the tray comprises two side bars, said side bars having outwardly extending flanges adapted and constructed to ride on to at least two vertically displaced adjacent rails, the end of said side bars being jointed by an end bar, a bus connector being mounted through said end bar adapted and constructed to mate with said connector on said backplane, connecting means on said tray whereby an electronic component may be mounted thereon.

5. The modular frame assembly for housing computer components of claims 1 or 2 wherein the side bars of the tray opposite the said end bar terminate in ears at an oppositely directed acute angle, whereby said ears may be used to slidably release said tray.

6. The modular frame assembly for housing computer components of claim 2 wherein said base components are secured to the bottom of two separate chasses, each having its subchassis and said base components are in spaced relationship.

7. The modular frame assembly for housing computer components of claims 1 or 2 wherein at least one of the chassis components are fastened to the subchassis by male-female ball and socket means.

8. The modular frame assembly for housing computer components of claims 1 or 2 wherein a space in the subchassis defined by a portion of the upper plate, a portion of the lower plate, the back plate and backplane, said space is adapted to construct to retain an electronic component.

9. A slidable tray for containing an electronic component in a modular assembly having substantially a U-shaped configuration comprising two parallel side legs, said side legs having outwardly extending flanges detailed to slide on rails, said slide bars being connected at their ends by a cross-piece, said cross-piece having mounted therethrough a bus connector, a plate connecting at least a portion of the bottom of said side bars and the bottom of said cross-piece whereby to provide a shelf for at least a portion of a retained electronic component, said side bars having mounting means for said electronic component, said side bars terminating in ears extending beyond said side bars and at an acute angle with respect to said side bars.

10. The modular frame assembly for housing computer components of claim 2 wherein the rectangular top of the outer chassis has at least one slot adapted and constructed to retain a CD-ROM box and said top is spaced from the said rectangular upper plate.

11. The modular frame assembly for housing computer components of claim 1 wherein a plurality of said frame assemblies are stacked horizontally.

12. The modular frame assembly for housing computer components of claim 1 wherein said plurality of said frame assemblies are mounted to vertical support means.

13. The modular frame assembly for housing computer components of claims 1, 2 or 3 wherein said backplane has a plurality openings adapted and constructed to provide at least one tray with dual small computer standard interface.

\* \* \* \* \*